Oct. 25, 1966    W. FROEDE    3,280,802
FLUID COOLED HOUSING WALL FOR INTERNAL COMBUSTION ENGINES
Filed Sept. 15, 1964    2 Sheets-Sheet 2

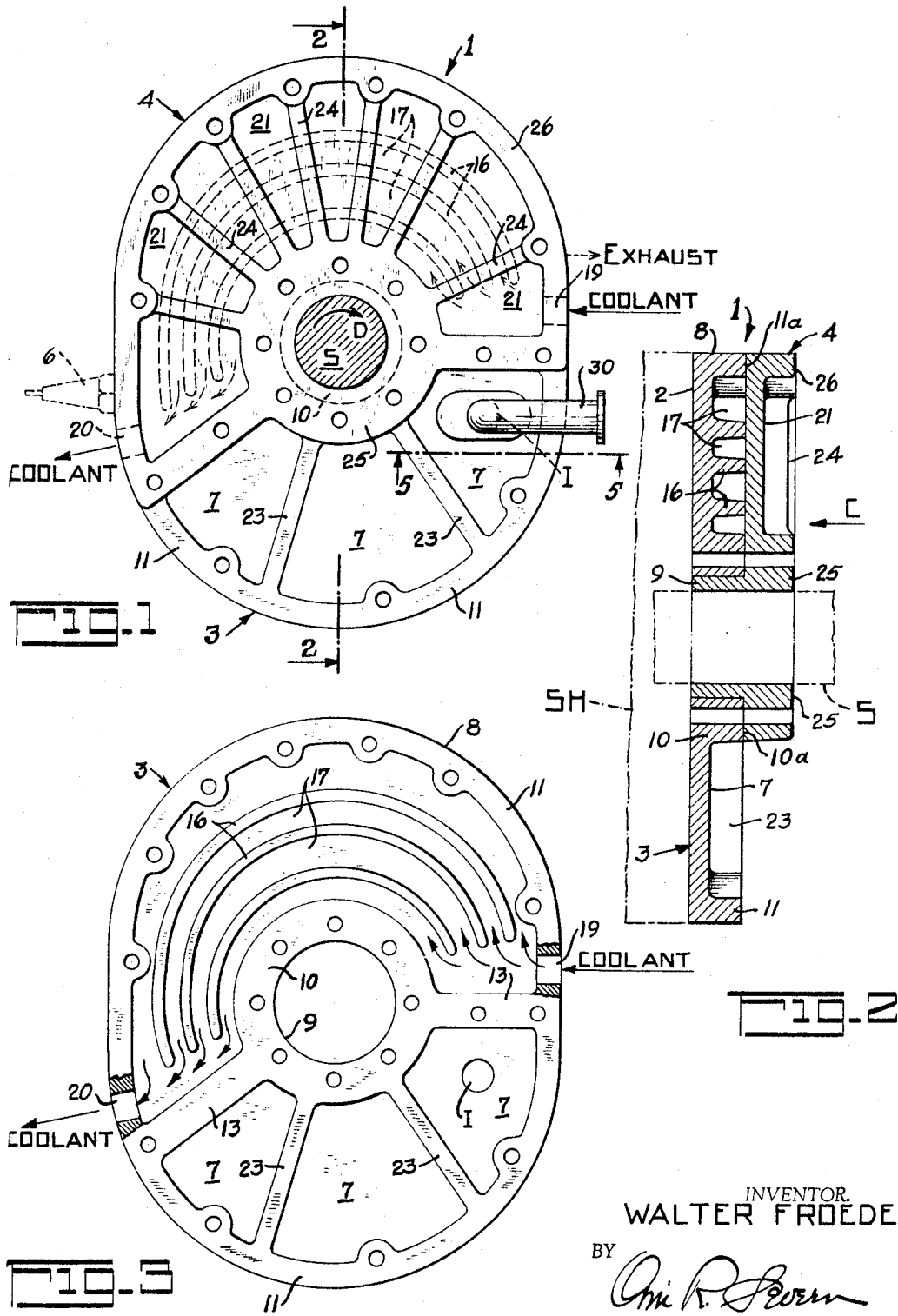

INVENTOR.
WALTER FROEDE
BY
*Ami R. Severn*
HIS ATTORNEY

United States Patent Office 3,280,802
Patented Oct. 25, 1966

3,280,802
FLUID COOLED HOUSING WALL FOR INTERNAL COMBUSTION ENGINES
Walter Froede, Neckarsulm, Germany, assignor to NSU Motorenwerke Aktiengesellschaft, Neckarsulm, Germany, and Wankel G.m.b.H., Lindau, Germany
Filed Sept. 15, 1964, Ser. No. 396,595
Claims priority, application Germany, Oct. 26, 1963, N 15,519
9 Claims. (Cl. 123—8)

This invention relates to fluid cooled housing walls for internal combustion engines, and particularly to rotary combustion engines.

In the rotary combustion engine, herein referred to as "RC engine," a rotary piston is so mounted for eccentric movement within an enclosing housing that during each revolution it successively defines working chambers for the complete operating cycle, including fuel-air mixture intake, compression, combustion and exhaust. Accordingly, the enclosing housing is subject to uneven heat distribution, involving a "hot" section or region at the adjoining areas where maximum compression, combustion and exhaust of the hot gases occur. This hot section of the housing requires efficient application of a cooling medium, whereas the section receiving the comparatively cool mixture during intake and initial compression requires little if any, special cooling. An RC engine of this type is disclosed by way of example in U.S. Patent No. 3,081,753, granted March 19, 1963.

The enclosing housing in this form of RC engine comprises a peripheral shell, the inner wall of which defines the path of outermost travel of the rotor, and a pair of parallel side wall members that are attached to opposite sides of the shell to complete the rotor enclosure. The peripheral shell defines a two-lobe cavity, shaped for example as an epitrochoid, one lobe encompassing generally the aforesaid "hot region" and the other lobe the "cold region." In practice, the peripheral shell on the one hand, and the enclosing opposite side walls on the other, usually are individually cooled, each having channels or passages defining respective cooling systems that together, surround the "hot region" of the engine.

The present invention is concerned primarily with the engine side walls, as distinguished from the shell proper. The side wall of an RC engine is generally constructed so that the over-all thickness dimension axially, along both lobes of the shell cavity is roughly uniform. Side walls of uniform axial thickness may be unnecessarily heavy and expensive, and the engine proper may have an over-all axial dimension that in some instances does not well lend itself to vary compact installations, including multi-unit construction. The side wall axial dimension depends on factors such as the size and shape of the enclosed coolant passages, mechanical strength and rigidity considerations, etc. The over-all axial dimension of the engine comprises not only the combined axial dimensions of the shell and the aforesaid side walls, but also that of any essential side wall attachment or connection extending laterally from a side wall. Any reduction in effect of the combined axial dimension of side wall and lateral attachment results therefore in corresponding reduction of the engine's over-all axial dimension.

A principal object of the present invention therefore is to provide an improved fluid cooled side wall structure for RC engines, that can be simple and easily fabricated, that is rugged and inexpensive in construction, and compact and light in weight.

A further object of the invention is to provide improved fluid-cooled side wall structure of the character described above, wherein the effective side wall axial dimension is materially reduced, while retaining at the "hot region" the essential heat transfer areas of the wall cooling passages, and the essential strength and rigidity of the side wall structure throughout both the "hot" and "cold" regions.

In accordance with the invention, a side wall of the engine comprises essentially two complementary parts, one of which encloses entirely the respective side of the shell cavity, and the other but partially overlies the first part, specifically at the "hot region" area. These two parts are complementary in adjoining-surface configuration to form peripheral cooling passages extending throughout the "hot region" in roughly "nested" or concentric relation with respect to the engine shaft axis; also each part at the shaft axis has a central hub, one of which extends through the other and forms a rigid journal or bearing support for the shaft.

Thus, the fluid passages for the "hot region" of the side wall are formed by minimum structure, and the "cold region" side, which is covered by the first wall part only, has minimum axial thickness at that area for providing additional axial space for auxiliary attachments, etc. essential to engine operation.

The invention will be more fully set forth in the following description referring to the accompanying drawings and the features of novelty will be pointed out with particularity in the claims annexed to and forming a part of this specification.

Referring to the drawings:

FIG. 1 is a plan view of a rotary combustion engine showing a multi-part side wall thereof embodying the present invention;

FIG. 2 is a partial view of a section taken along line 2—2 of FIG. 1 showing the cooling passages within the aforesaid side wall;

FIG. 3 is a plan view of the inner part of the side wall shown in FIG. 2;

Figure 4:
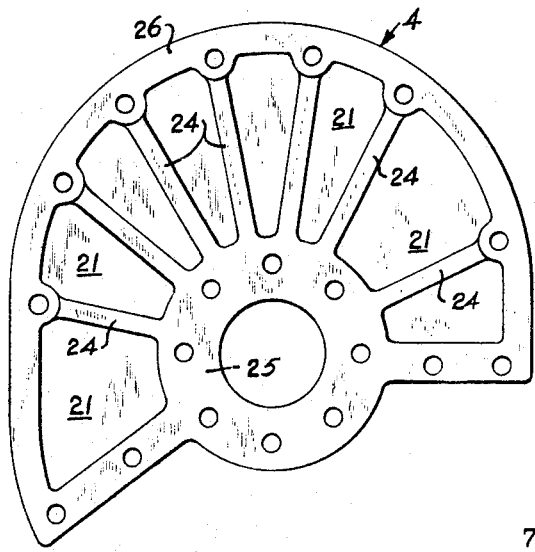
FIG. 4 is a plan view of the outer part of the side wall shown in FIG. 2.

Referring to FIG. 1, the housing of an RC engine, one side of which is shown herein, comprises a main shell (indicated at SH, FIG. 2) to which opposite side walls that may be of similar construction are secured. A detail description therefore of one side wall will be sufficient for illustrating the invention. An RC engine of this general type is disclosed by way of example in U.S. Patent No. 3,081,753, granted March 19, 1963.

The side wall shown, generally indicated at 1, has two parts 3 and 4, that are joined together in the manner mentioned above, the inner part 3 completely enclosing one side of the shell cavity and encompassing both the "hot" and "cold" regions, and the outer part 4 overlying the part 3 as shown, only at the upper side, hereinafter referred to as the "hot region." The lower side of the wall covered only by the inner plate 3 is referred to as the "cold region." The engine shaft S is journalled in the respective aligned central hubs of the parts 3 and 4 as hereinafter described.

Referring to FIG. 2, the engine-cavity side 2 of the inner part 3 adjoins the engine shell housing generally indicated at SH. The engine shaft S extends from the shell through the side wall 1 and is mounted in a hub portion of the outer part 4. The side wall 1 is cooled by a fluid that flows solely across the "hot region" which extends in the direction of indicated shaft rotation approximately from the ignition area or spark plug 6 to the hot gas exhaust channel E. The fluid cooled region of the inner part 3 is defined at its opposite ends by two transverse walls or barriers 13 extending radially from the central portion to the periphery of part 3. The part 3 is constructed essentially as a thin-walled disk that is stiffened at its side 7 adjacent to and surrounding the shaft, by a hub portion 10, and at its periphery 8 by an offset flange 11. The transverse walls 13 interconnect the hub portion 10 and peripheral flange 11 and form stiffening structure for the part 3, as well as delimit the "hot" and "cold" regions with respect to special cooling thereof.

The side wall cooling passages comprise channels extending in parallel formed between the inner part 3 and the outer part 4. These parts may be bolted together and to the shell SH to form a unitary rigid structure. As shown in FIGS. 2 and 3 the inner part 3 has a plurality of cooling ribs or fins 16 disposed on the outer face 7 of part 3 in generally concentric relation about the shaft. The free edges of the ribs terminate in a plane that also defines the bearing faces 10a and 11a of the hub portion 10 and flange 11 respectively, so that the corresponding plane surface at the inner side of part 4 forms with these ribs cooling channels 17, FIGS. 2 and 3. The ribs 16 also serve an additional purpose in stiffening the integrated side wall, as will be seen from FIG. 2.

In the example shown, FIG. 3, the cooling fluid is circulated through the passages 16 in the side wall from the inlet opening at 19 to the outlet opening at 20. These openings are conveniently made in the peripheral flange 11 of part 3, the transverse walls 13 serving to confine the coolant within the "hot region" of the side wall.

As shown in FIGS. 3 and 4, the parts 3 and 4 of the side wall each have radial stiffening ribs 23 and 24 respectively apart from the cooling structure. The ribs 23 of part 3 overlie the "cold region," and the ribs 24 of part 4, FIG. 4 extend radially throughout the arcuate portion 4 at its outer side and reinforce the side wall throughout the "hot region." In the case of part 3, the ribs 23 extend between the hub portion 10 and the peripheral flange 11 for preventing distortion or bulging of the thin-wall disk. The radial stiffening ribs 24 of the outer part 4 extend between the peripheral flange 26 and the hub portion 25 and specially serve to take corresponding bearing forces in that direction. That is, the part 4 is ribbed in particular in the direction of the maximum bearing forces considering the expansion stroke of the rotary piston. As shown, the hub portion 25 of part 4 comprises the main shaft support as it extends throughout the axial dimension of the side wall. The hub flange 10 of the inner part 3 is preferably mounted on a reduced diameter end of the hub 9 so as to form with the part 4 a close fit as shown in FIG. 2.

Figure 5:
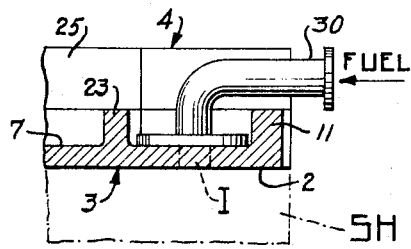
FIGURE 5 is a partial view of a section taken along the line 5—5 of FIG. 1.

FIG. 5 illustrates the practical advantage of reducing the effective axial dimension of the side wall at the "cold region." The inlet opening I for the fuel-air mixture that extends through the disk 3 at a suitable point offset from part 4 in the "cold region," FIG. 3, may be connected to a supply pipe 30 that extends laterally and then parallel to the disk so as still to be within the outer axial limit of the part 4. The over-all axial dimension of the engine is thereby in effect reduced to this extent, i.e. by the axial dimension ordinarily required by the supply connection 30 where connected to a side wall of uniform thickness extending throughout the "hot" and "cold" regions.

In multi-unit engines where the units are stacked along a common shaft, each inlet channel may be similarly connected in known manner to a manifold that extends along the engine generally parallel to the shaft; thus the axial dimension of the complete engine is reduced to an optimum.

It should be understood that this invention is not limited to specific details of construction and arrangement thereof herein illustrated, and that changes and modifications may occur to one skilled in the art without departing from the spirit of the invention.

I claim:

1. A fluid cooled housing for an engine of the rotary combustion type having a main shell forming a cavity with opposite side walls enclosing the cavity and a centrally positioned operating shaft mounted in said side walls, the engine in operation having a hot region extending between peripheral limits along the shell and over a major part of each side wall area and a cold region extending over the remaining area, one side wall comprising two complementary parts including a first part that encloses the corresponding side of the shell and a second part overlying said first part in the hot region area only, said first part having a plurality of spaced ribs extending transversely thereof and abutting an adjoining planar surface of said second part to form cooling channels extending in parallel between the limits of said hot region, said second part having a bearing support for mounting said shaft.

2. Engine housing wall structure as specified in claim 1 wherein the first part is a disk-like plate and the ribs thereon are approximately concentrically positioned with respect to the shaft to form with the second part corresponding cooling channels across the hot region area, said plate having stiffening ribs radially extending throughout the cold region area.

3. Engine housing wall structure as specified in claim 1 wherein the second part is an arcuate plate having a peripheral exterior flange, a hub portion for shaft bearing support, and stiffening ribs at the side opposite its cooling passage side extending radially between the hub portion and said peripheral flange throughout the arcuate span of said second part.

4. Engine housing wall structure as specified in claim 1 wherein the first part has a central hub-like flange axially aligned with the shaft and two transverse walls extending radially between said hub flange and the periphery of said plate for enclosing at opposite ends respectively the space between said parts including the cooling channels and for defining the limits between the hot and cold regions.

5. Engine housing wall structure as specified in claim 1 wherein the first part has a fuel-air mixture supply opening therethrough to the shell cavity at one end of the cold region, said opening being separate from and offset with respect to said second part.

6. Engine housing wall structure as specified in claim 5 wherein a pipe connection is mounted on said first part in registry with said supply opening, and said pipe connection has a substantially right angle bend for extending the connection parallel to the first part and keeping it within the outer axial limit of the second part.

7. Engine housing wall structure as specified in claim 3 wherein the hub portion of the second part has an axial dimension corresponding to the total thickness of the side wall, and the first part has an axially aligned opening within which the corresponding end of said hub portion is rigidly mounted.

8. Engine housing wall structure as specified in claim 4 wherein the first part was a pheripheral flange for enclosing the aforesaid channel space along the hot region periphery, and said flange is provided with a transverse opening at one end of the hot region for supply of coolant, and a similar opening in said flange at the other end of the hot region for coolant outflow.

9. A fluid cooled engine housing side wall comprising two parallel disposed abutting plates, the first plate being a thin disk for enclosing the correspondence side of the engine housing, said side encompassing a hot region and a cold region of the engine, said first plate having stiffening ribs that extend over the cold region in a direction radially from the center toward the periphery of said plate together with a plurality of approximately equally spaced curved ribs in generally concentric arrangement extending across the hot region to form cooling channels in parallel, and having two transverse walls defining respectively the limits of the fluid-cooled hot region, the outer edges of said curved ribs and said transverse walls and a pheripheral part of said first plate all being coplanar, the second plate having a planar surface for abutting the aforesaid planar edges so as to enclose the aforesaid cooling channels between the first and second plates throughout the hot region, said second plate forming a bearing support centrally thereof for the engine shaft and having stiffening ribs extending radially in direction from said bearing support to the periphery of the second part.

References Cited by the Examiner

UNITED STATES PATENTS 1,874,308    8/1932    Kolko.

MARK NEWMAN, *Primary Examiner.*

F. T. SADLER, *Assistant Examiner.*